United States Patent [19]

Righi

[11] 4,133,014
[45] Jan. 2, 1979

[54] APPARATUS FOR REPRODUCING AND/OR RECORDING MAGNETIC TAPE IN CASSETTES

[75] Inventor: Nardino Righi, Milan, Italy

[73] Assignee: Ri-El Ricerche Elettroniche S.p.A., Cologno Monzese, Italy

[21] Appl. No.: 817,468

[22] Filed: Jul. 20, 1977

[30] Foreign Application Priority Data

Jul. 23, 1976 [IT] Italy .................................. 12729 A/76

[51] Int. Cl.$^2$ ...................... G11B 15/66; G11B 21/22; G11B 5/54
[52] U.S. Cl. ........................................ 360/96; 360/105
[58] Field of Search .................................. 360/96, 105

[56] References Cited
U.S. PATENT DOCUMENTS

| | | | |
|---|---|---|---|
| 3,959,821 | 5/1976 | Nardino | 360/96 |
| 3,987,486 | 10/1976 | Ito et al. | 360/96 |
| 4,044,391 | 8/1977 | Takamashi | 360/96 |
| 4,054,930 | 10/1977 | Terada | 360/96 |

*Primary Examiner*—Robert S. Tupper
*Attorney, Agent, or Firm*—Edwin E. Greigg

[57] ABSTRACT

An apparatus for reproducing and/or recording magnetic tape in cassettes, of the type particularly adapted to be mounted on an automobile, comprises a cassette receptacle and a mechanism-carrier plate, onto which are mounted the tape reel driving shaft and the drive capstan, which carrier plate is hingedly connected to the cassette receptacle so as to be movable in a parallel manner towards and away from the receptacle. The moving away or uncoupling of the mechanism-carrier plate from the cassette receptacle is caused by the inward movement of a control slide, which is operatively associated with the carrier plate and with a carrier element carrying the magnetic head and the tape pinch roller, the carrier element being also movable towards and away from the side of the cassette receptacle. The movement, or coupling, of the carrier plate towards the cassette receptacle inside which a cassette is being inserted, is caused by the insertion of the cassette, which abuts against an actuating element thus releasing a locking device which maintained the cassette receptacle and the carrier plate spaced apart from each other, against the action of a spring.

4 Claims, 7 Drawing Figures

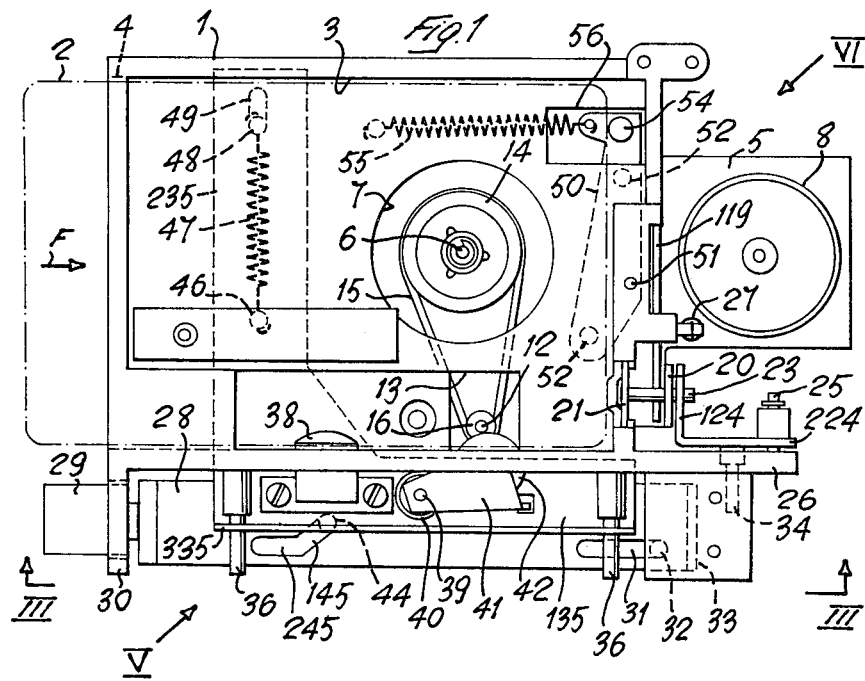
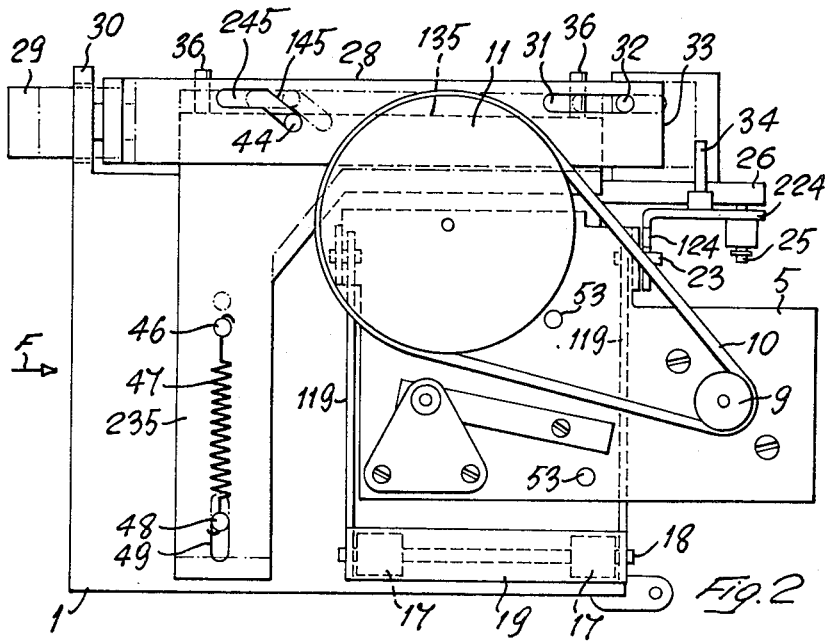

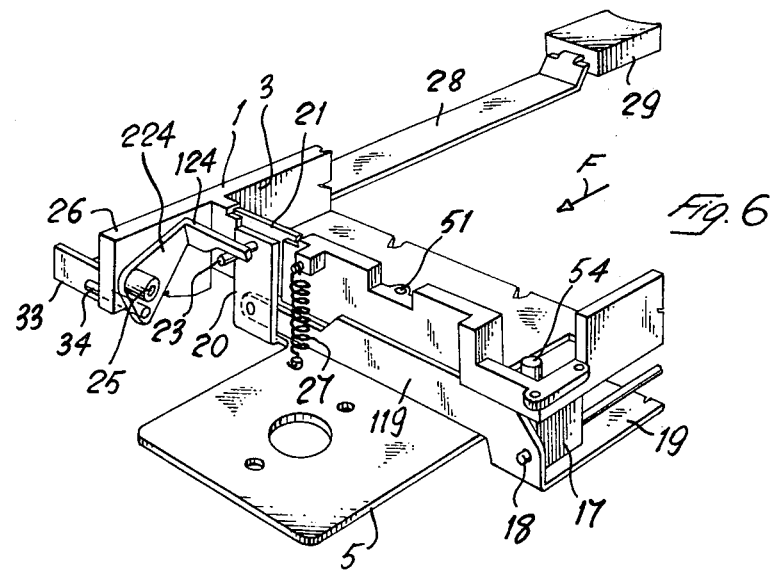
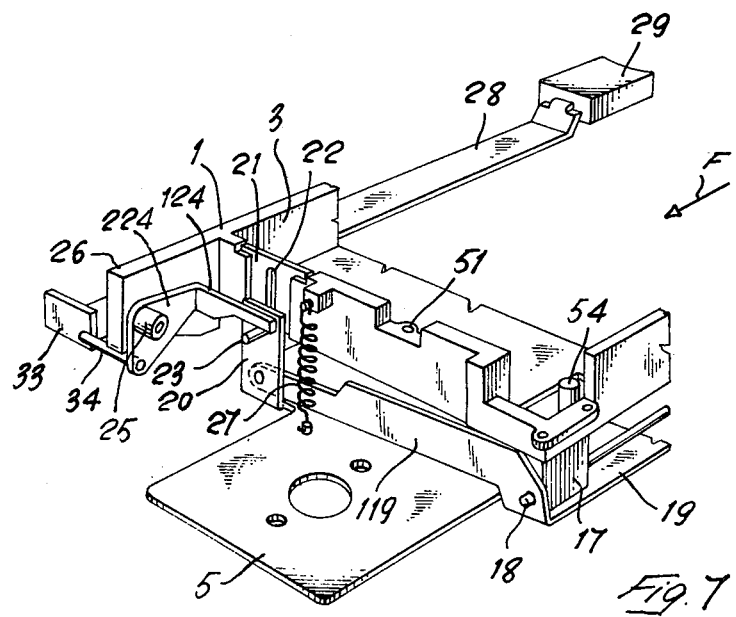

APPARATUS FOR REPRODUCING AND/OR RECORDING MAGNETIC TAPE IN CASSETTES

SUMMARY OF THE INVENTION

The present invention relates to an apparatus for reproducing and/or recording magnetic tapes in cassettes, of the type particularly adaped to be mounted on automobiles.

An apparatus of this type requires, among others, to be particularly compact, that is to say to present very reduced dimensions, since the space available on board an automobile, particularly in the proximity of the driver's seat, is very limited. This requirement does not create any difficulty with respect to the electronic circuitry, where printed and integrated circuits are now commonly used which solve the problem of space in a completely satisfactory manner.

The problem remains however for the tape transport mechanism, i.e. the plurality of components which ensure the transport of the tape which is to be reproduced and/or recorded, and the correct introduction and expulsion of the cassette.

According to the invention, there is proposed a novel apparatus which is characterized by the following elements:

(a) a cassette receptacle inside which a cassette can be introduced according to a predetermined direction of introduction and expulsion;

(b) a mechanism-carrier plate movable towards and away from the cassette receptacle for the operative engagement of at least a drive capstan and a tape reel driving shaft carried by the mechanism-carrier plate when the cassette is introduced into the cassette receptacle;

(c) a manually operated control slide movable in a direction parallel to the direction of introduction of the cassette, said control slide being operatively associated with the mechanism-carrier plate for effecting its movement away from the cassette receptacle, against the action of spring means which tend to move the carrier plate into coupling engagement with the cassette receptacle;

(d) a carrier element which carries a magnetic head and a tape pinch roller, said carrier element being movable towards and away from the cassette receptacle, its movement being controlled by the said control slide with which it is operativey engaged; and (e) a locking device for locking the mechanism-carrier plate in its position away and apart from the cassette receptacle, said locking device being actuated from its locking position to a release position, in which the carrier plate moves into coupling engagement with the cassette receptacle, under the action of the cassette whenever the cassette is introduced into the said cassette receptacle.

BRIEF DESCRIPTION OF THE DRAWINGS

The above and others features of the invention and the advantages derived therefrom will appear evident from the following description of a preferred embodiment of same, made with reference to the attached drawings, in which:

FIG. 1 is a view from the top of an apparatus according to the invention.

FIG. 2 is a view from the bottom of the same apparatus of FIG. 1.

FIGS. 6 and 7 are fragmentary perspective views in the direction of arrow VI of FIG. 1 showing details of the operative engagement between the control slide and the mechanism-carrier plate.

DESCRIPTION OF THE PREFERRED EMBODIMENT

Figure 3:
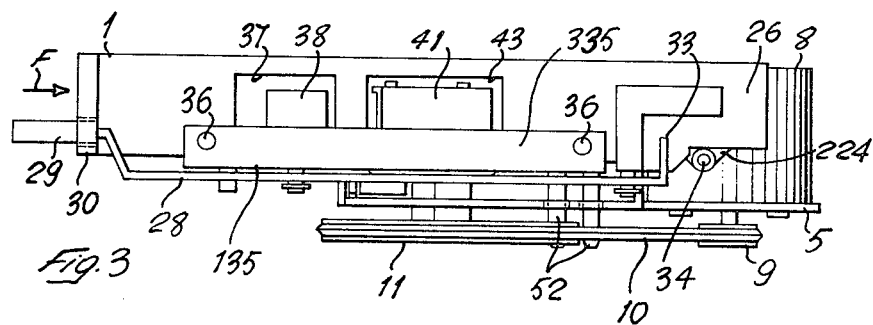
FIG. 3 is an elevation view in the direction of arrows III—III of the apparatus according to FIG. 1, in the coupled position of the mechanism-carrier plate and the cassette receptacle.

In the drawings, reference numeral 1 indicates the fixed, box-like cassette receptacle made preferably of plastic and forming part of the tape transport mechanism for a cassette reproducer or recorder, particularly adapted to be mounted on vehicles. In FIG. 1 there is represented by dash-and-dot lines with cassette 2 which is introduced in the direction of the arrow F into the opening 4 of the cassette receptacle 1, within the loading space 3. Below the cassette receptacle 1 and, parallel thereto there is arranged a carrier plate 5 for the tape driving mechanism. The tape driving mechanism includes a tape reel driving shaft 6 which passes through an opening 7 in the cassette receptacle 1 and is intended to engage with its suitable profiled end the correspondingly profiled bore of the hub of the winding reel of the cassette 2, whenever the cassette is inserted into the cassette receptacle 1. The driving shaft 5 us rotatably driven by an electric motor 8 and a pulley and belt transmission 9, 10, 11 arranged on the carrier plate 5. The tape driving mechanism incudes also a tape driving capstan 12, which can enter into the cassette receptacle through a bore 13 provided on the receptacle and can be brought into engagement with the tape of the cassette 1 which has been introduced. The drive to the capstan 12 is obtained from the reel driving shaft 6 through a pulley and belt transmission 14, 15, 16.

The carrier plate 5 is hingedly connected to the said cassette receptacle 1 so as to move up and down towards and away from the receptacle. For this purpose, the cassette receptacle 1 is provided with two lower lugs 17 (see particularly FIGS. 5, 6 and 7). Between said lugs there extends a hinge pin 18, parallel to the direction of introduction F of the cassette 2, onto which hinge pin there is hingedly arranged a U-shaped lever 19. At the free ends of both arms 119 of said lever 19 there is hingedly connected the plate-like carrier 5. On the outer side of the rear wall (in the direction of introduction F of the cassette) of the cassette receptacle 1 there is secured a small metal plate 21 provided with a vertical, slightly curved guide slot 22. A corresponding, upwardly projecting hinge lug 20 on the carrier 5 is provided with a transversely extending engaging pin 23 projecting from both sides of the lug 20, which pin 23 engages the guide slot 22 of the metal plate 21, as shown in FIGS. 1, 6 and 7. On the other side of the hinge lug 20 the pin 23 is engaged by the outwardly extending arm 124 of a swinging square lever 124, 224 which is pivotally mounted with its arm 224 about a fixed axis 25 on a projecting portion 26 of the cassette receptacle 1.

In this manner, the carrier plate 5 can perform a translatory motion with respect to the cassette receptacle 1, in parallel relationship therewith towards and away from the receptacle.

Between the cassette receptacle 1 and the carrier plate 5 there is connected to a coupling spring 27 which is constructed as a tensioning spring, and which has the function to urge the tape transport mechanism carrier 5 upwardly in the direction of the cassette receptacle, into a coupling position, as illustrated in FIGS. 3 and 6.

Adjacent to the cassette receptacle, on the side which is opposite the lever 19, there is arranged a flat control slide 28 which extends parallel to and is slidable in the direction of introduction F of the cassette. To this end, the control slide 28 is slidably mounted, with its front end 29 shaped as push-button, in a correspondingly shaped guide slot provided on a projecting part 30 of the cassette receptacle 1. The rear end of the control slide 28 is provided with a longitudinal guide slot 31 which engages a fixed guide pin 32. On its rear end the control slide 28 terminates in an upwardly bent lug or flange 33, which cooperates with a pin 34 provided on the pivotal lever 224, as illustrated in FIGS. 3, 4, 6 and 7.

Adjacent the control slide 28 there is mounted an L-shaped carrier element 135 for the magnetic head. One arm of this carrier element 135 extends parallel to the control slide 28 and is provided with an outer edge flange 335 turned upwardly the flange 335 is provided with suitable apertures for receiving by guide pins 36 projecting outwardly from the side of the cassette receptacle, for guiding the movement of the carrier element 135 parallel to the side of cassette receptacle 1. The magnetic head 38 is secured to the magnetic head carrier element 135 for alignment with an opening 37 provided in the side wall of the cassette receptacle 1. On the carrier element 135 there is moreover mounted, swingable about pin 39, the carrier 41 of the pinch roller 42, loaded by spring 40. The pinch roller 42 cooperates, through an opening 43 in the side wall of the receptacle, with the tape driving capstan 12. The carrier element 135 carries also a pin 44 which engages an angle-shaped guide slot 245 having an oblique portion 145 in the control slide 28. On the other arm 235 of the carrier element 135 there is provided a pin 46 which is connected by a tension spring 47 with a pin 48 provided on the underside of the cassette receptacle 1, which pin 48 engages a guide slot 49 provided in the arm 235. The function of the spring 47 is to urge the magnetic head carrier element 135 towards the cassette receptacle 1.

Figure 5:
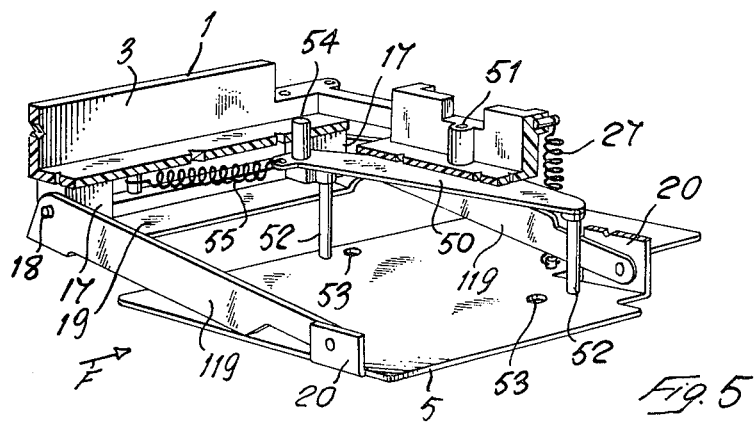
FIG. 5 is a fragmentary perspective view in the direction of arrow V of FIG. 1 showing the details of the locking device for locking the carrier plate in its position away and apart from the cassette receptacle.

Adjacent the rear portion of the tape transport mechanism there is arranged, between the cassette receptacle 1 and the carrier plate 5, a locking lever 50, as illustrated in FIG. 5. The said locking lever 50 is mounted for pivotal movement around an axis 51 which is perpendicular to the carrier plate 5, and is provided on its underside with two projecting abutment pins 52 which act as separating or spacing fingers with respect to the underlying carrier plate 5. On the said carrier plate 5 there are provided two bores 53. On its upper side the locking lever 50 is provided with an actuation projection 54 which projects into the cassette space 3 in the cassette receptacle through an opening 56 in the bottom of the cassette receptacle 1, and which is intended to cooperate with the cassette 2. A tension spring 55 is provided which has the function of urging the locking lever 50 into the position illustrated in FIG. 5.

Figure 4:
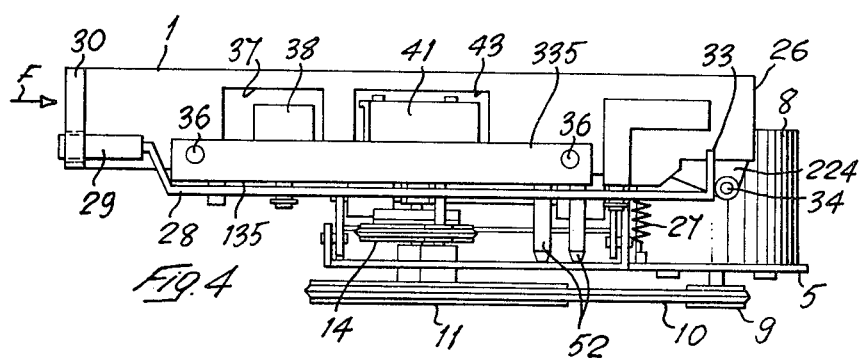
FIG. 4 is an elevation view similar to that of FIG. 3, showing the apparatus in its rest position, with the mechanism-carrier plate uncoupled and moved apart from the cassette receptacle.

In the rest position of the apparatus, illustrated in FIGS. 4, 5 and 7 the control slide 28 is pushed inwardly. The flange 33 of said slide 28 thus effects through pin 34 of lever 224, the swinging down of arm lever 124 and the corresponding downward movement of pin 23 and consequently the movement of the carrier plate 5 downwardly and apart from the cassette receptacle 1, into its uncoupling or rest position. The carrier plate 5 (which carries the reel shaft 6 and the drive capstan 12) is maintained in its lowered, uncoupled release position (against the action of spring 27) by the locking lever 50 which is urged into the locking position under the action of spring 55.

The magnetic head carrier element 135 is in its rest position, i.e. moved away with respect to the cassette receptacle 1, and the magnetic head 38 and pinch roller 42 do not engage the cassette 2.

By inserting the cassette 2 in the direction of introduction F into the cassette receptacle, the cassette 2 abuts against the actuation projection 54 of the locking lever 50 and causes the swinging of the lever against the action of spring 55, into the release position, in which the pins 52 penetrate into the bores 53 of the carrier plate 5. Thus, the carrier plate 5 is lifted due to the action of spring 27, in the direction of the cassette receptacle 1 (FIGS. 3 and 6). The reel shaft 6 and the drive capstan 12, carried by the carrier plate 5, operatively engage the cassette 2. In its lifting movement, the carrier plate 5 causes the swinging of the lever 224 through the pin 23, thus effecting, through the pin 34 acting on the flange 33, the outward movement of the control slide 28 (FIGS. 3 and 6). Following this movement of the control slide 28, the pin 44 of the magnetic head carrier, element 135 is progressively controlled by the guide slot 245 of the control slide. When the pin 44 engages the oblique portion 145 of the guide slot, the magnetic head carrier element 135 is moved towards the cassette, and the magnetic head 38 and pinch roller 42 operatively engage the cassette 2. The complete outward position of the control slide 28 is shown by full lines in FIGS. 1 and 2, from which clearly appears the disengagement of the flange 33 of the slide, from the pin 34 of the lever 224.

By partially pushing in the control slide 28, the pin 44 of the magnetic head carrier element 135 is engaged by the inclined portion 145 of the guide slot, so as to move the magnetic head carrier element away from the cassette, thus disengaging the magnetic head 38 and the pinch roller 42 from the tape of the said cassette. Since however the carrier plate 5 remains in its lifted or "coupling" position the reel shaft 6 is still engaged with the reel of the cassette, and therefore it provides for its "fast forward" movement. The position of fast forward movement is illustrated by dash-and-dot lines in FIG. 2.

In order to cause the expulsion of the cassette 2 from the receptacle 1, the slide 28 is completely pushed inwardly, as shown in FIGS. 4 and 7. The pin 44 of the magnetic head carrier element 135 is engaged by the longitudinal portion of the guide slot 245 of the slide, and the magnetic head 38 and pinch roller 42 are securely maintained in their inoperative position. The end flange 33 of the control slide 28 engages the pin 34 of the lever 224 and effects the swinging of the said lever from the position of FIG. 6 to the position of FIG. 7. The lever 224 presses down the pin 23 of the carrier plate 5 and thus the carrier plate 5 is lowered or uncoupled with respect to the cassette receptacle 1. The reel shaft 6 and the drive capstan 12 are operatively disengaged from the cassette 2. The pins 52 of the locking lever 50 come out of the bores 53 of the carrier 5 and the locking lever 50 is therefore caused to swing under the action of spring 55, thus causing, through the actuation projection 54, the partial expulsion of the cassette. The carrier plate 5 is maintained in this position even when pressure is no longer exerted on the control slide 28, due to the position of the locking lever 50 (see FIG. 5) in which the pins 52 of the locking lever are not aligned with respect to the bores 53 of the carrier plate 5.

I claim:

1. An apparatus for reproducing and/or recording magnetic tape in cassettes comprising, in combination,
   (a) a cassette receptacle having an interior into which a cassette is introduced in a predetermined direction of introduction and expulsion;
   (b) a carrier plate, means supporting said carrier plate on said receptacle for movement towards and away from said cassette receptacle, at least a drive capstan and a tape reel driving shaft mounted on said carrier plate for engagement with the cassette introduced into said cassette receptacle interior when said plate is moved towards said receptacle;
   (c) a manually operated control slide, means for supporting said control slide on said receptacle for reciprocating movement in a direction parallel to the direction of introduction of the cassette, spring means for urging said carrier plate towards said receptacle for coupling engagement therewith, and means for mechanically connecting said control slide to said carrier plate for effecting a movement of said carrier plate away and apart from said cassette receptacle against the urging of said spring means upon movement of said control slide;
   (d) a carrier element, means supporting said carrier element on said receptacle for relative movement towards and away from said receptacle, a magnetic head and pinch roller mounted on said carrier element, means for biasing said carrier element towards said receptacle for operative engagement between the magnetic head and punch roller on said element and a cassette introduced into said receptacle interior, and means for operatively connecting said control slide to said carrier element for effecting the movement of said carrier element away and apart from said cassette receptacle against the force of said biasing means upon movement of said control slide;
   (e) locking means on said receptacle for locking said carrier plate in said position away and apart from said cassette receptacle, means for biasing said locking device into said locking position in the absence of a cassette in said receptacle interior, means actuated by the introduction of a cassette into the interior of said cassette receptacle for moving said locking means from said locking position to a release position against said biasing means to permit said carrier plate to move into coupling engagement with said cassette receptacle under the urging of said spring means 2. An apparatus according to claim 1, wherein said means for operatively connecting said control slide to said carrier plate includes a lever pivotally mounted on said cassette receptacle, an abutment on said control slide, an arm on said lever engagable with said carrier plate and means on said lever engagable with said abutment on said control slide.

3. An apparatus according to claim 1, wherein said means for operatively connecting said control slide to said carrier element includes a pin mounted on said carrier element, said control slide being provided with a guide slot for slidably accommodating said pin, said guide slot having a portion extending parallel to the direction of movement of said slide and a portion which is oblique with respect to said direction.

4. An apparatus for reproducing and/or recording magnetic tape in cassettes comprising, in combination,
   (a) a cassette receptacle having an interior into which a cassette is introduced in a predetermined direction of introduction and expulsion;
   (b) a carrier plate, means supporting said carrier plate on said receptacle for movement towards and away from said cassette receptacle, at least a drive capstan and a tape reel driving shaft mounted on said carrier plate for engagement with the cassette introduced into said cassette receptacle interior when said plate is moved towards said receptacle;
   (c) normally operated control slide, means for supporting said control slide on said receptacle for reciprocating movement in a direction parallel to the direction of introduction of the cassette, first spring means for urging said carrier plate towards said receptacle for coupling engagement therewith, and means for mechanically connecting said control slide to said carrier plate for effecting a movement of said carrier plate away and apart from said cassette receptacle against the urging of said first spring means upon movement of said control slide;
   (d) a carrier element means supporting said carrier element on said receptacle for relative movement towards and away from said receptacle, a magnetic head and pinch roller mounted on said carrier element, means for biasing said carrier element towards said receptacle for operative engagement between the magnetic head and pinch roller on said element and a cassette introduced into said receptacle interior, and means for operatively connecting said control slide to said carrier element for effecting the movement of said carrier element away and apart from said cassette receptacle against the force of said biasing means upon movement of said control slide;
   (d) locking means on said receptacle for locking said carrier plate in said position away and apart from said cassette receptacle, said locking means comprises a locking lever pivotally mounted on an axis extending perpendicular with respect to said carrier plate, at least one spacing pin on said locking lever arranged to engage said carrier plate, said carrier plate having a bore for accommodating the passage of said pin therethrough, second spring means on said receptacle connected to said locking lever for urging said locking lever to a position in which said spacing pin is misaligned with said bore to maintain said carrier plate away and apart from said cassette receptacle in the absence of a cassette in said receptacle interior, an actuation projection on said locking lever extending within said cassette receptacle whereby a cassette introduced into said receptacle abuts against said actuation projection to effect pivotal movement of said locking lever to a position in which said spacing pin and said bore are aligned thereby permitting the passage of said spacing pin through said bore in said carrier plate and the movement of the carrier plate into coupling engagement with said cassette receptacle under the urging of said first spring means.

* * * * *